(12) United States Patent
Ganesan et al.

(10) Patent No.: US 12,323,338 B2
(45) Date of Patent: Jun. 3, 2025

(54) TRANSMITTING DATA USING A RELAY USER EQUIPMENT

(71) Applicant: Lenovo (Singapore) Pte. Ltd., New Tech Park (SG)

(72) Inventors: Karthikeyan Ganesan, Kronberg im Taunus (DE); Prateek Basu Mallick, Dreieich (DE); Joachim Loehr, Wiesbaden (DE); Ravi Kuchibhotla, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/102,425

(22) Filed: Jan. 27, 2023

(65) Prior Publication Data

US 2023/0171199 A1 Jun. 1, 2023

Related U.S. Application Data

(63) Continuation of application No. 17/183,163, filed on Feb. 23, 2021, now Pat. No. 11,588,746, which is a
(Continued)

(51) Int. Cl.
*H04L 47/56* (2022.01)
*H04B 7/155* (2006.01)
(Continued)

(52) U.S. Cl.
CPC ............. *H04L 47/56* (2013.01); *H04B 7/155* (2013.01); *H04L 1/08* (2013.01); *H04L 45/20* (2013.01); *H04W 72/20* (2023.01); *H04W 88/04* (2013.01)

(58) Field of Classification Search
CPC ..... H04L 45/20; H04L 1/1874; H04L 1/1896; H04L 47/56; H04L 1/1893; H04L 1/08; H04B 7/155; H04W 72/20
See application file for complete search history.

(56) References Cited

U.S. PATENT DOCUMENTS

2007/0275657 A1 11/2007 Chang et al.
2009/0235138 A1* 9/2009 Chang ................... H04L 1/1854
714/E11.131
(Continued)

FOREIGN PATENT DOCUMENTS

WO 2014014165 A1 1/2014
WO 2018095550 A1 5/2018

OTHER PUBLICATIONS

3GPP, "3rd Generation Partnership Project; Technical Specification Group Radio Access Network; NR; Study on NR Vehicle-to-Everything (V2X) (Release 16)", 3GPP TR 38.885 V16.0.0 Mar. 2019, pp. 1-122.
(Continued)

*Primary Examiner* — Anez C Ebrahim
(74) *Attorney, Agent, or Firm* — Kunzler Bean & Adamson

(57) ABSTRACT

Apparatuses, methods, and systems are disclosed for transmitting data corresponding to a relay UE. One method includes transmitting data and first information indicating relay information corresponding to retransmission of the data by a relay UE to at least one UE. The first information comprises a relay identifier, an indication that retransmission of the data is based on feedback received by the relay UE, an indication that retransmission of the data is based on a multi-hop count, an indication for the relay UE to transfer the data from a receiver buffer to a transmit buffer and to retransmit the data from the transmit buffer, an indication for the relay UE to retransmit the data to an indicated destination node, or some combination thereof. The method includes transmitting second information indicating a remaining packet delay budget to the at least one UE.

20 Claims, 7 Drawing Sheets

Related U.S. Application Data continuation of application No. 16/517,087, filed on Jul. 19, 2019, now Pat. No. 10,938,733.

(51) Int. Cl.
*H04L 1/08* (2006.01)
*H04L 45/00* (2022.01)
*H04W 72/20* (2023.01)
*H04W 88/04* (2009.01)

(56) References Cited

U.S. PATENT DOCUMENTS

| | | | |
|---|---|---|---|
| 2010/0131670 A1 | 5/2010 | Ishii et al. | |
| 2010/0246478 A1 | 9/2010 | Liu et al. | |
| 2017/0295531 A1 | 10/2017 | Singh et al. | |
| 2018/0115362 A1* | 4/2018 | Yasukawa | H04B 7/15507 |
| 2018/0206176 A1* | 7/2018 | Panteleev | H04W 28/04 |
| 2018/0234465 A1* | 8/2018 | Kim | H04L 61/5014 |
| 2022/0321278 A1* | 10/2022 | Yoshioka | H04L 1/1854 |

OTHER PUBLICATIONS

3GPP, "3rd Generation Partnership Project; Technical Specification Group Services and System Aspects; Enhancement of 3GPP support for V2X scenarios; Stage 1 (Release 16)", 3GPP TS 22.186 V16.2.0, Jun. 2019, pp. 1-18.

* cited by examiner

TRANSMITTING DATA USING A RELAY USER EQUIPMENT

CROSS-REFERENCE TO RELATED APPLICATIONS

This application is a continuation application of U.S. patent application Ser. No. 17/183,163 filed on Feb. 23, 2021, which is a continuation application of U.S. patent application Ser. No. 16/517,087 filed on Jul. 19, 2019, which is incorporated herein by reference in its entirety.

FIELD

The subject matter disclosed herein relates generally to wireless communications and more particularly relates to transmitting data using a relay user equipment.

BACKGROUND

The following abbreviations are herewith defined, at least some of which are referred to within the following description: Third Generation Partnership Project ("3GPP"), 4$^{th}$ Generation ("4G"), 5$^{th}$ Generation ("5G"), 5G System ("5GS"), Positive-Acknowledgment ("ACK"), Aggregation Level ("AL"), Access and Mobility Management Function ("AMF"), Access Network ("AN"), Access Point ("AP"), Authentication Server Function ("AUSF"), Beam Failure Detection ("BFD"), Binary Phase Shift Keying ("BPSK"), Base Station ("BS"), Buffer Status Report ("BSR"), Bandwidth ("BW"), Bandwidth Part ("BWP"), Carrier Aggregation ("CA"), Contention-Based Random Access ("CBRA"), Clear Channel Assessment ("CCA"), Control Channel Element ("CCE"), Cyclic Delay Diversity ("CDD"), Code Division Multiple Access ("CDMA"), Control Element ("CE"), Contention-Free Random Access ("CFRA"), Closed-Loop ("CL"), Coordinated Multipoint ("CoMP"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Device-to-Device ("D2D"), Discrete Fourier Transform Spread ("DFTS"), Downlink Control Information ("DCI"), Downlink ("DL"), Demodulation Reference Signal ("DMRS"), Data Radio Bearer ("DRB"), Discontinuous Reception ("DRX"), Downlink Pilot Time Slot ("DwPTS"), Enhanced Clear Channel Assessment ("eCCA"), EPS Connection Management ("ECM"), Enhanced Mobile Broadband ("eMBB"), Evolved Node B ("eNB"), Effective Isotropic Radiated Power ("EIRP"), European Telecommunications Standards Institute ("ETSI"), Evolved Packet Core ("EPC"), Evolved Packet System ("EPS"), Evolved Universal Terrestrial Access ("E-UTRA"), Evolved Universal Terrestrial Access Network ("E-UTRAN"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), 5G Node B or Next Generation Node B ("gNB"), Group Leader ("GL"), General Packet Radio Services ("GPRS"), Guard Period ("GP"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Home PLMN ("HPLMN"), Home Subscriber Server ("HSS"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Layer 1 ("L1"), Layer 2 ("L2"), Layer 3 ("L3"), Licensed Assisted Access ("LAA"), Load Based Equipment ("LBE"), Listen-Before-Talk ("LBT"), Logical Channel ("LCH"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Minimum Communication Range ("MCR"), Modulation Coding Scheme ("MCS"), Master Information Block ("MIB"), Multiple Input Multiple Output ("MIMO"), Mobility Management ("MM"), Mobility Management Entity ("MIME"), Mobile Network Operator ("MNO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), Network Entity ("NE"), Network Function ("NF"), Next Generation RAN ("NG-RAN"), Non-Orthogonal Multiple Access ("NOMA"), New Radio ("NR"), Network Repository Function ("NRF"), Network Slice Instance ("NSI"), Network Slice Selection Assistance Information ("NSSAI"), Network Slice Selection Function ("NSSF"), Network Slice Selection Policy ("NSSP"), Operation and Maintenance System ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), LTE-to-V2X Interface ("PC5"), Primary Cell ("PCell"), Policy Control Function ("PCF"), Physical Cell ID ("PCID"), Physical Downlink Control Channel ("PDCCH"), Packet Data Convergence Protocol ("PDCP"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Platoon Leader ("PL"), Public Land Mobile Network ("PLMN"), Platoon Member ("PM"), Physical Random Access Channel ("PRACH"), Physical Resource Block ("PRB"), Primary Secondary Cell ("PSCell"), Physical Sidelink Control Channel ("PSCCH"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Registration Area ("RA"), Radio Access Network ("RAN"), Radio Access Technology ("RAT"), Random Access Procedure ("RACH"), Random Access Response ("RAR"), Resource Element Group ("REG"), Radio Link Control ("RLC"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Shared Channel ("SCH"), Sidelink Control Information ("SCP"), Sub-carrier Spacing ("SCS"), Service Data Unit ("SDU"), System Information Block ("SIB"), SystemInformationBlockType1 ("SIB1"), SystemInformationBlockType2 ("SIB2"), Sub scriber Identity/Identification Module ("SIM"), Signal-to-Interference-Plus-Noise Ratio ("SINR"), Sidelink ("SL"), Service Level Agreement ("SLA"), Session Management Function ("SMF"), Special Cell ("SpCell"), Single Network Slice Selection Assistance Information ("S-NSSAI"), Shortened TTI ("sTTI"), Synchronization Signal ("SS"), Synchronization Signal Block ("SSB"), Scheduling UE ("SUE"), Supplementary Uplink ("SUL"), Subscriber Permanent Identifier ("SUPI"), Candidate Resource Selection Time Window ("T2"), Tracking Area ("TA"), TA Indicator ("TAI"), Transport Block ("TB"), Transport Block Size ("TBS"), Time-Division Duplex ("TDD"), Time Division Multiplex ("TDM"), Time Division Orthogonal Cover Code ("TD-OCC"), Transmission Power Control ("TPC"), Transmission Reception Point ("TRP"), Transmission Time Interval ("TTI"), Time to Live ("TTL"), Transmit ("TX"), Uplink Control Information ("UCI"), Unified Data Management Function ("UDM"), Unified Data Repository ("UDR"), User Entity/Equipment (Mobile Terminal) ("UE"), Universal Integrated Circuit Card ("UICC"), Uplink ("UL"), Universal Mobile Telecommunications System ("UMTS"), User Plane ("UP"), Uplink Pilot Time Slot ("UpPTS"), Ultra-reliability and Low-latency Communications ("URLLC"), UE Route Selection Policy ("URSP"), LTE Radio Interface ("Uu"), Vehicle-To-Everything ("V2X"), Visiting AMF ("vAMF"), Visiting NSSF ("vNSSF"), Visiting PLMN ("VPLMN"), Interconnecting Interface ("X2") ("Xn"), and Worldwide Interoperability for Microwave Access ("WiMAX").

In certain wireless communications networks, V2X communication may be used. In such networks, the V2X communication may be used to relay data.

BRIEF SUMMARY

Methods for transmitting data corresponding to a relay user equipment are disclosed. Apparatuses and systems also perform the functions of the apparatus. One embodiment of a method includes transmitting data and first information indicating relay information corresponding to retransmission of the data by a relay user equipment to at least one user equipment. In such an embodiment, the at least one user equipment is within a predetermine group of user equipments or outside of the predetermined group of user equipments, the first information comprises a relay identifier, an indication that retransmission of the data is based on feedback received by the relay user equipment, an indication that retransmission of the data is based on a multi-hop count, an indication for the relay user equipment to transfer the data from a receiver buffer to a transmit buffer and to retransmit the data from the transmit buffer, an indication for the relay user equipment to retransmit the data to an indicated destination node, or some combination thereof. In certain embodiments, the method includes transmitting second information indicating a remaining packet delay budget to the at least one user equipment.

One apparatus for transmitting data corresponding to a relay user equipment includes a transmitter that: transmits data and first information indicating relay information corresponding to retransmission of the data by a relay user equipment to at least one user equipment, wherein the at least one user equipment is within a predetermine group of user equipments or outside of the predetermined group of user equipments, the first information comprises a relay identifier, an indication that retransmission of the data is based on feedback received by the relay user equipment, an indication that retransmission of the data is based on a multi-hop count, an indication for the relay user equipment to transfer the data from a receiver buffer to a transmit buffer and to retransmit the data from the transmit buffer, an indication for the relay user equipment to retransmit the data to an indicated destination node, or some combination thereof; and transmits second information indicating a remaining packet delay budget to the at least one user equipment.

One embodiment of a method for receiving data corresponding to a relay user equipment includes receiving, by at least one user equipment, data and first information indicating relay information corresponding to retransmission of the data by a relay user equipment. In such an embodiment, the at least one user equipment is within a predetermine group of user equipments or outside of the predetermined group of user equipments, the first information comprises a relay identifier, an indication that retransmission of the data is based on feedback received by the relay user equipment, an indication that retransmission of the data is based on a multi-hop count, an indication for the relay user equipment to transfer the data from a receiver buffer to a transmit buffer and to retransmit the data from the transmit buffer, an indication for the relay user equipment to retransmit the data to an indicated destination node, or some combination thereof. In certain embodiments, the method includes receiving, by the at least one user equipment, second information indicating a remaining packet delay budget.

One apparatus for receiving data corresponding to a relay user equipment includes a receiver that: receives, by at least one user equipment, data and first information indicating relay information corresponding to retransmission of the data by a relay user equipment, wherein the at least one user equipment is within a predetermine group of user equipments or outside of the predetermined group of user equipments, the first information comprises a relay identifier, an indication that retransmission of the data is based on feedback received by the relay user equipment, an indication that retransmission of the data is based on a multi-hop count, an indication for the relay user equipment to transfer the data from a receiver buffer to a transmit buffer and to retransmit the data from the transmit buffer, an indication for the relay user equipment to retransmit the data to an indicated destination node, or some combination thereof; and receives, by the at least one user equipment, second information indicating a remaining packet delay budget.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
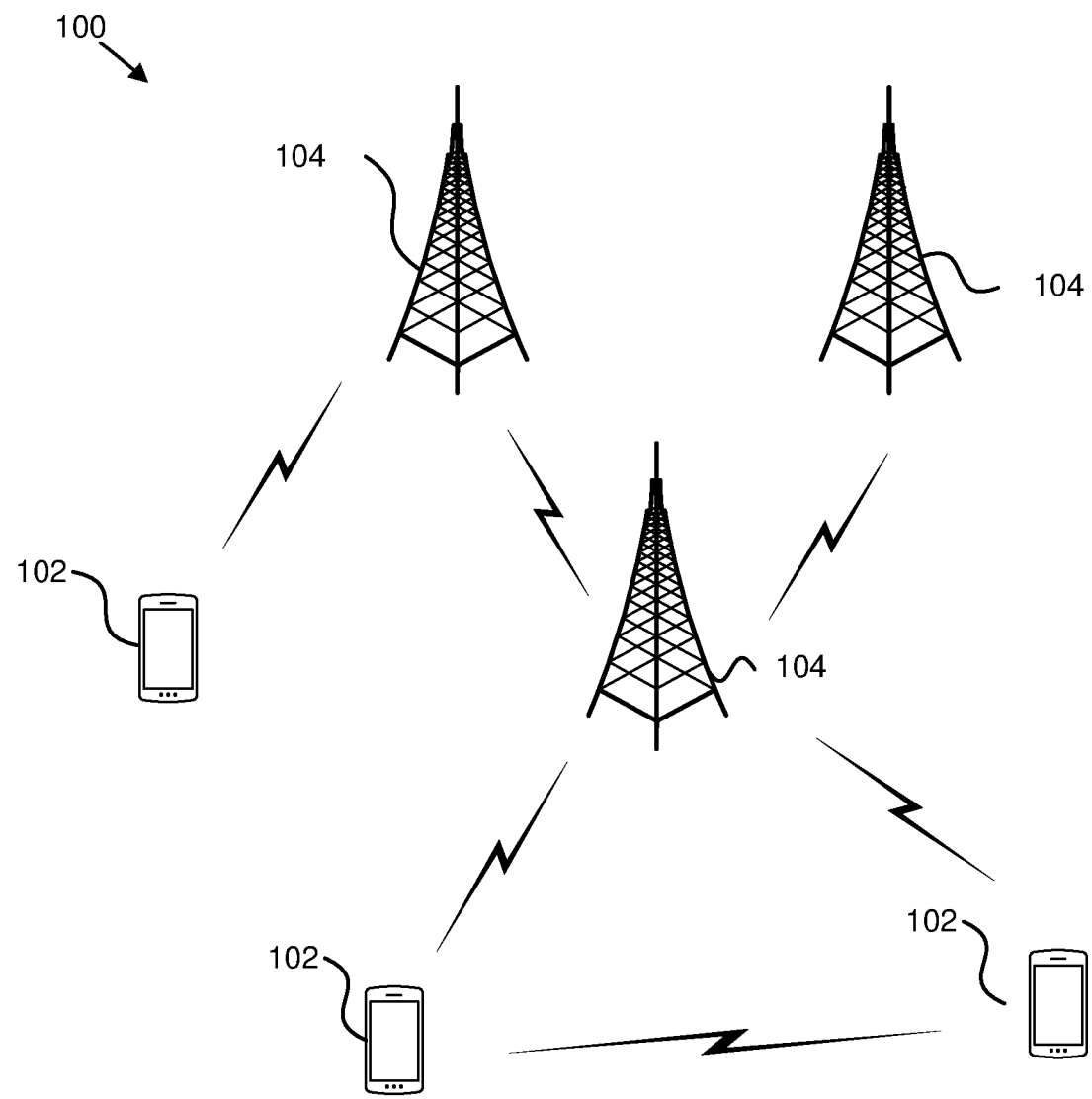
FIG. 1 is a schematic block diagram illustrating one embodiment of a wireless communication system for transmitting data using a relay user equipment.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for transmitting data using a relay user equipment. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. The remote units 102 may also communicate directly with one or more of the other remote units 102.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may transmit data and first information indicating relay information corresponding to retransmission of the data by a relay user equipment to at least one user equipment. In such an embodiment, the at least one user equipment is within a predetermine group of user equipments or outside of the predetermined group of user equipments, the first information comprises a relay identifier, an indication that retransmission of the data is based on feedback received by the relay user equipment, an indication that retransmission of the data is based on a multi-hop count, an indication for the relay user equipment to transfer the data from a receiver buffer to a transmit buffer and to retransmit the data from the transmit buffer, an indication for the relay user equipment to retransmit the data to an indicated destination node, or some combination thereof. In certain embodiments, the remote unit 102 may transmit second information indicating a remaining packet delay budget to the at least one user equipment. Accordingly, the remote unit 102 may be used for transmitting data corresponding to a relay user equipment.

In one embodiment, a remote unit 102 may receive, by at least one user equipment, data and first information indicating relay information corresponding to retransmission of the data by a relay user equipment. In such an embodiment, the at least one user equipment is within a predetermine group of user equipments or outside of the predetermined group of user equipments, the first information comprises a relay identifier, an indication that retransmission of the data is based on feedback received by the relay user equipment, an indication that retransmission of the data is based on a multi-hop count, an indication for the relay user equipment to transfer the data from a receiver buffer to a transmit buffer and to retransmit the data from the transmit buffer, an indication for the relay user equipment to retransmit the data to an indicated destination node, or some combination thereof. In certain embodiments, the remote unit 102 may receive, by the at least one user equipment, second information indicating a remaining packet delay budget. Accordingly, the remote unit 102 may be used for receiving data corresponding to a relay user equipment.

Figure 2:
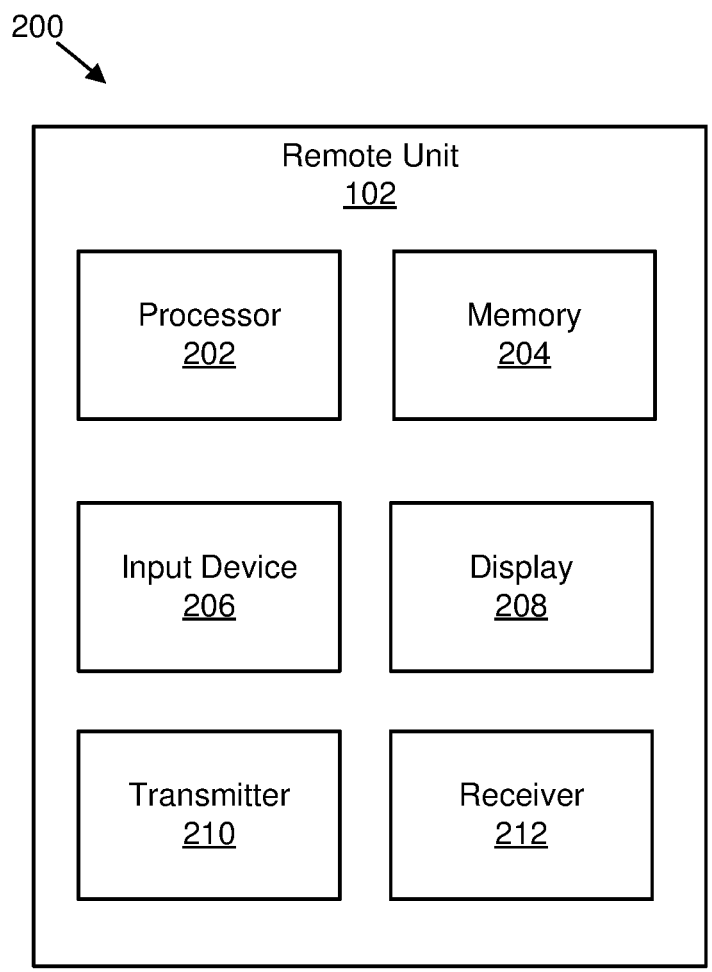
FIG. 2 is a schematic block diagram illustrating one embodiment of an apparatus that may be used for transmitting data using a relay user equipment.

FIG. 2 depicts one embodiment of an apparatus 200 that may be used for transmitting data using a relay user equipment. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. In some embodiments, the transmitter 210: transmits data and first information indicating relay information corresponding to retransmission of the data by a relay user equipment to at least one user equipment, wherein the at least one user equipment is within a predetermine group of user equipments or outside of the predetermined group of user equipments, the first information comprises a relay identifier, an indication that retransmission of the data is based on feedback received by the relay user equipment, an indication that retransmission of the data is based on a multi-hop count, an indication for the relay user equipment to transfer the data from a receiver buffer to a transmit buffer and to retransmit the data from the transmit buffer, an indication for the relay user equipment to retransmit the data to an indicated destination node, or some combination thereof; and transmits second information indicating a remaining packet delay budget to the at least one user equipment.

In various embodiments, the receiver 212: receives, by at least one user equipment, data and first information indicating relay information corresponding to retransmission of the data by a relay user equipment, wherein the at least one user equipment is within a predetermine group of user equipments or outside of the predetermined group of user equipments, the first information comprises a relay identifier, an indication that retransmission of the data is based on feedback received by the relay user equipment, an indication that retransmission of the data is based on a multi-hop count, an indication for the relay user equipment to transfer the data from a receiver buffer to a transmit buffer and to retransmit the data from the transmit buffer, an indication for the relay user equipment to retransmit the data to an indicated destination node, or some combination thereof; and receives, by the at least one user equipment, second information indicating a remaining packet delay budget.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
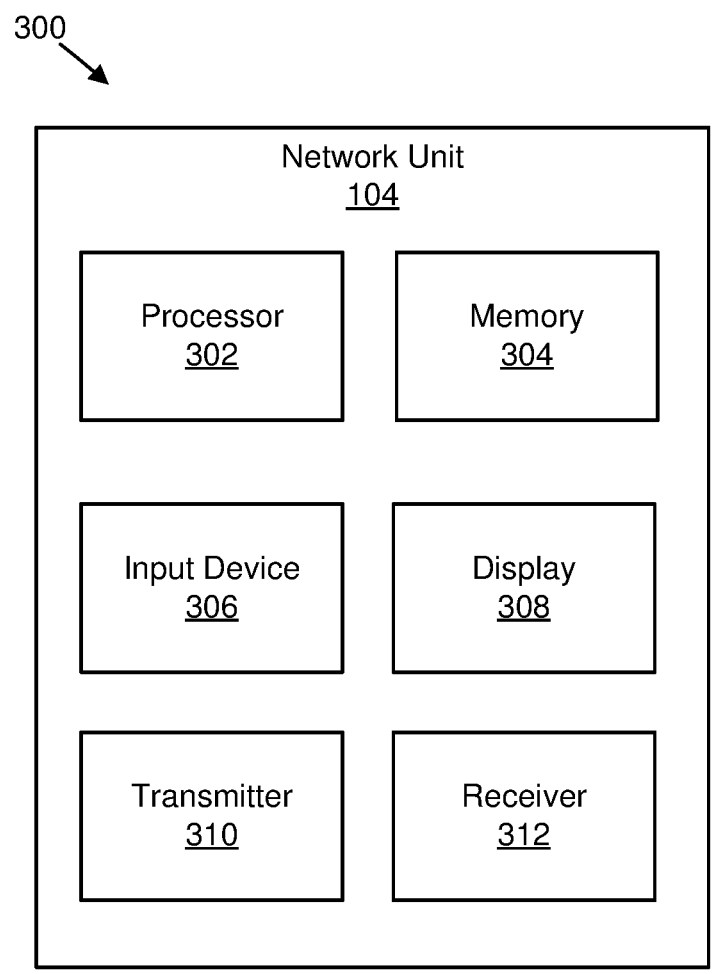
FIG. 3 is a schematic block diagram illustrating one embodiment of an apparatus that may be used for configuring a user equipment.

FIG. 3 depicts one embodiment of an apparatus 300 that may be used for configuring a user equipment. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

As used herein, the terms eNB and/or gNB may be used for a base station, but may be replaceable by any other radio access node (e.g., BS, eNB, gNB, AP, NR, and so forth). Furthermore, various embodiments herein may be described in the context of 5G NR; however, the embodiments may be applicable to other mobile communication systems supporting serving cells and/or carriers, such as systems configured for sidelink communication over a PC5 interface.

In certain embodiments, for PL-to-PMs communications, a PL may transmit a CAM to all the PMs including details regarding a trajectory, distance control, etc., using a groupcast transmission.

In various embodiments, for PM-to-PM communications, after a CAM from a PL is received by a platoon, each PM transmits its own CAM to update the nearest platoon member using a groupcast transmission or a unicast transmission.

In some embodiments, to enhance the reliability of message reception by member UEs in a platoon, HARQ feedback for groupcast transmission may be used. As may be appreciated, due to vehicular shadowing or self blocking, some member UEs may not reliably receive packets from a platoon leader and relaying messages from the platoon leader may be performed to enhance reliability of message reception with the group.

In certain embodiments, a platoon leader may communicate outside of a group (e.g., platoon) to discover new platoon members and allow the new platoon members into its group. In some embodiments, a platoon member leaving a group may inform its platoon leader and/or other platoon members of its intention to leave the group. Moreover, the platoon member may discover and/or join another platoon. In various embodiments, one platoon may merge with another platoon by creating a bigger platoon group. In such embodiments, coverage enhancement may be achieved by relaying messages originating from a platoon member or a platoon leader.

In some embodiments, messages are relayed or retransmitted by an intermediate UE (e.g., relay UE) based on HARQ feedback. For example, a platoon leader transmits an initial groupcast transmission message and each of the platoon members receives and processes the message for its V2X application. Each platoon member then retransmits or relays the message to its neighbor member based on HARQ feedback (e.g., based on whether ACK is received, based on whether NACK is received, based on an ACK signal strength, based on a NACK signal strength, etc.). In such embodiments, each member UE may be provided with dedicated ACK/NACK resources and the feedback resource configuration for all UEs may be known to each other.

In certain embodiments, messages are relayed or retransmitted by intermediate UEs without HARQ feedback. In such embodiments, a platoon leader transmits an initial groupcast transmission within or outside of a group without expecting any HARQ feedback.

Figure 4:
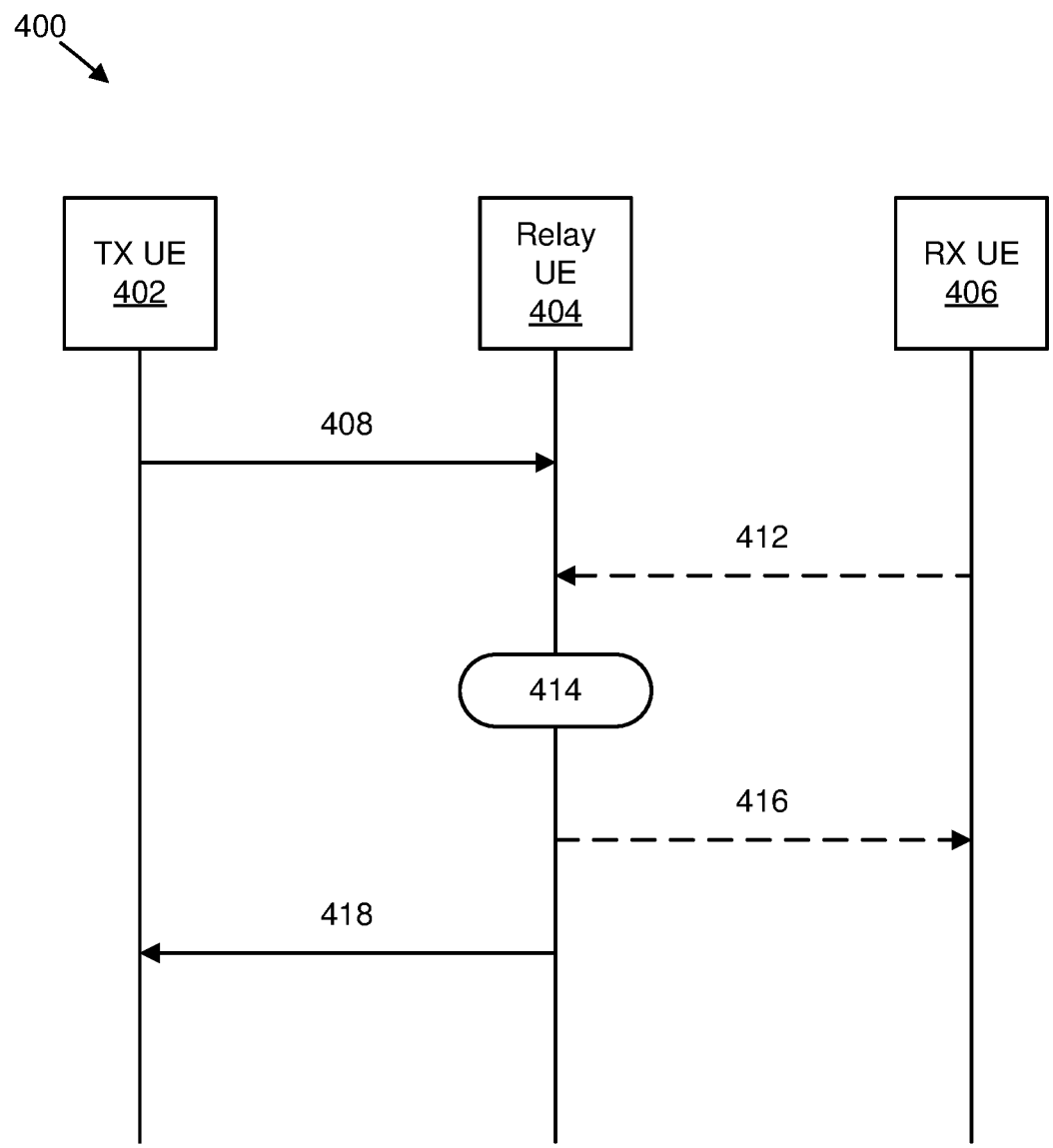
FIG. 4 is a schematic block diagram illustrating one embodiment of communications corresponding to transmitting data using a relay user equipment.

FIG. 4 is a schematic block diagram illustrating one embodiment of communications 400 corresponding to transmitting data using a relay user equipment (e.g., a relay based on HARQ feedback and within a group). The communications 400 include messages transmitted between a TX UE 402, a relay UE 404 (e.g., intermediate UE, intermediate node), and a RX UE 406. As may be appreciated, any of the communications described herein may include one or more messages.

In one embodiment, in a first communication 408 transmitted from the TX UE 402 to the relay UE 404 (or multiple UEs of which some or all may be relay UEs), the TX UE 402 transmits a transport block (e.g., data) with an indication for relaying the transport block by the relay UE 404 (e.g., any other UE in the group, all other UEs in the group, etc.) based on HARQ feedback (e.g., within SCI).

In some embodiments, the TX UE 402 may reserve resources for the relay UE 404 to use to transmit (or retransmit) the transport block. Moreover, as part of the first communication 408 (or in another communication) the TX UE 402 may provide the reserved resource information to the relay UE 404. The reserved resource information may include assistance information for reserving resources, such as for periodic resource reservation used for periodic traffic. In certain embodiments, the TX UE 402 may provide the reserved resource information to the relay UE 404 via a first stage or a second stage of SCI, in L1, or in L2. The relay UE 404 may use the reserved resource for retransmission based on the relay flag.

In certain embodiments, if there is no resource reservation information transmitted from the TX UE 402 (e.g., in SCI) to the relay UE 404, the relay UE 404 may select one or more resources for transmission (or retransmission) from a resource pool (e.g., a dedicated resource pool for such transmissions) based on sensing which resources from the resource pool are available or by randomly selecting resources from within the resource pool. In some embodiments, the resource pool may be based on mode 2d operation. For example, mode 2d may be applied to vehicular UEs in a group. In such a scenario, only a group leader is enabled to schedule sidelink transmissions of other member UEs in the group. A scheduling UE may be selected by an application layer or a gNB. After the scheduling UE is selected by the application, the selection information (plus group information) may be transmitted to the gNB so that the gNB may adjust a scheduling policy for the scheduling UE. As may be appreciated, mode 2d may be applicable for groupcast and unicast services. For in-coverage embodiments, the scheduling UE may be configured by a base station. While for out-of-coverage embodiments, the scheduling UE may be pre-configured as the scheduling UE. For example, a UE with high capability or scheduling capability may be appointed as the scheduling UE. For groupcast services, the leader UE in the group (e.g., the head vehicle in a platoon) may manage the group.

In certain embodiments, in the first communication 408 transmitted from the TX UE 402 to the relay UE 404 (or multiple UEs of which some or all may be relay UEs), the TX UE 402 transmits end to end latency information to the relay UE 404 for the relay UE 404 to use for delivering the transport block. The end to end latency information may be conveyed by transmitting a remaining packet delay budget (e.g., a TTL configuration for transport block reception).

In some embodiments, SCI (e.g., SCI fields) or other signaling may be used to transmit the following information from the TX UE 402 to the relay UE 404: 1) end to end latency information; 2) resource reservation information for the relay UE 404 to use for transmitting or retransmitting data (e.g., a transport block) (for example, this may be included in the first stage or the second stage of the SCI); and/or 3) a relay flag that indicates whether a groupcast transport block that is received with a destination group ID should be transmitted or retransmitted by the relay UE 404 (e.g., based on HARQ feedback). In certain embodiments, a relay flag may be an L2 or L3 flag present in MAC CE, RLC, or PDCP headers instead of being part of SCI.

In various embodiments, one or more relay UEs 404 may be selected for transmission (or retransmission) of the transport block received from the TX UE 402. The selection of the one or more relay UEs 404 may be a selection of one or more UEs within a group (e.g., platoon) configured to receive and process HARQ feedback information from all member UEs in the group. The selection may be based on one of the following options: 1) the gNB may configure (e.g., semi-statically, statically, dynamically, etc.) an SUE in the group that monitors the HARQ NACK feedback within the group and transmits (or retransmits) the transport block in response to receiving HARQ NACK feedback (there may be one or more SUEs in a group and the UE ID of the one or more SUEs may be known to the group member UEs); 2) the selection of one or more relay UEs 404 for transmission (or retransmission) may be dynamically determined by the UEs in a group based on a HARQ NACK feedback and/or a HARQ ACK feedback reception threshold (e.g., signal strength) (the threshold may be an RSRP or SINR threshold configured by the gNB or by the TX UE 402—for example, any UE in the group that receives HARQ NACK feedback having a signal strength above a certain threshold may act as a relay UE 404 and may transmit (or retransmit) the transport block within the group); 3) the selection of one or more relay UEs 404 may be dynamically determined by a group member UE based on HARQ ACK feedback, HARQ NACK feedback, and/or explicit signaling (e.g., in one example a group member UE may not decode an initial groupcast transport block and all group UEs may monitor a HARQ ACK feedback resource of surrounding member UEs—by not receiving a HARQ ACK from a nearby UE a group member UE may know that it needs to transmit or retransmit the transport block, in another example, a UE that does not receive the initial groupcast transport block may explicitly signal the need for transmission or retransmission—a group member UE that is near that UE may act as a relay UE 404 based on the received signal strength of the HARQ ACK message. In one embodiment, the explicit signaling may include L1 SCI signaling with a relay request flag); and/or 4) all group member UEs or a subset of group member UEs may be used for transmission, retransmission, and/or relay (e.g., based on reception of HARQ ACK and/or HARQ NACK feedback).

In some embodiments, the relay UE 404 within the group may receive the initial transport block from the TX UE 402 may monitor for a third communication 412 that includes HARQ feedback and/or signaling transmitted from the RX UE 406 (e.g., a group member UE) to the relay UE 404.

The relay UE 404 may determine 414 whether it should retransmit the transport block to the RX UE 406 based on: whether the relay UE 404 is selected for retransmission; whether a HARQ ACK and/or HARQ NACK was received; a signal strength of a received HARQ ACK; a signal strength of a received HARQ NACK; and/or an explicit signal indicating retransmission.

In response to the relay UE 404 determining 414 to retransmit the transport block, in a fourth communication 416, the relay UE 404 retransmits the transport block to the RX UE 406.

In various embodiments, the relay UE 404 takes into account the remaining packet delay budget value transmitted by the TX UE 402 to schedule a transmission or retransmission. In one embodiment, the delay budget value may be used as a T2 value (e.g., a number of subframes or slots expressed in ms) for candidate resource selection.

In some embodiments, the relay UE 404 may, based on a relay flag (e.g., a relay flag in SCI, an L1 relay flag, an L2 relay flag, an L3 relay flag, etc.), transfer a transport block (e.g., data) from a receive buffer to a transmit buffer for transmission or retransmission (e.g., in the fourth communication 416). In such embodiments, the relay UE 404 may choose to transmit the transport block with the same HARQ process ID used by the TX UE 402, or the relay UE 404 may signal the HARQ process ID used by the TX UE 402 separately in SCI and may signal a redundancy version (e.g., for use in soft combining). In various embodiments, the relay UE 404 may check a destination group ID corresponding to a transport block and determine whether the message is for itself and/or for transmission or retransmission (e.g., based on a relay flag and/or HARQ feedback).

In certain embodiments, the relay UE 404 may have a configured maximum HARQ retransmission counter that it uses for transport blocks that do not originate from the relay UE 404 to count a number of times that the transport block is retransmitted by the relay UE 404.

In various embodiments, in a fifth communication 418 transmitted from the relay UE 404 to the TX UE 402, the relay UE 404 may transmit a status of groupcast message delivery (e.g., status of transmission or retransmission by the relay UE 404) to the TX UE 402. In such embodiments, feedback timing and resources may be provided by the TX UE 402 to the relay UE 404 so that the status of the groupcast message delivery may be sent to the TX UE 402. In embodiments corresponding to NR mode 1 in which the gNB schedules the sidelink transmission of the relay UE 404, downlink control information or a semi-static configuration contains an additional information element about a beam sweeping configuration that includes a time, frequency, spatial direction, and/or selection of antenna panel for the relay UE 404 for the groupcast or unicast control channel and data channel transmission. In embodiments corresponding to UE to UE relaying, the TX UE 402 configures the relay UE 404 either with sidelink control information or a semi-static configuration about the beam sweeping configuration that includes the time, frequency, spatial direction, and/or selection of antenna panel for the relay UE 404 for the groupcast or unicast control channel and data channel transmission.

Figure 5:
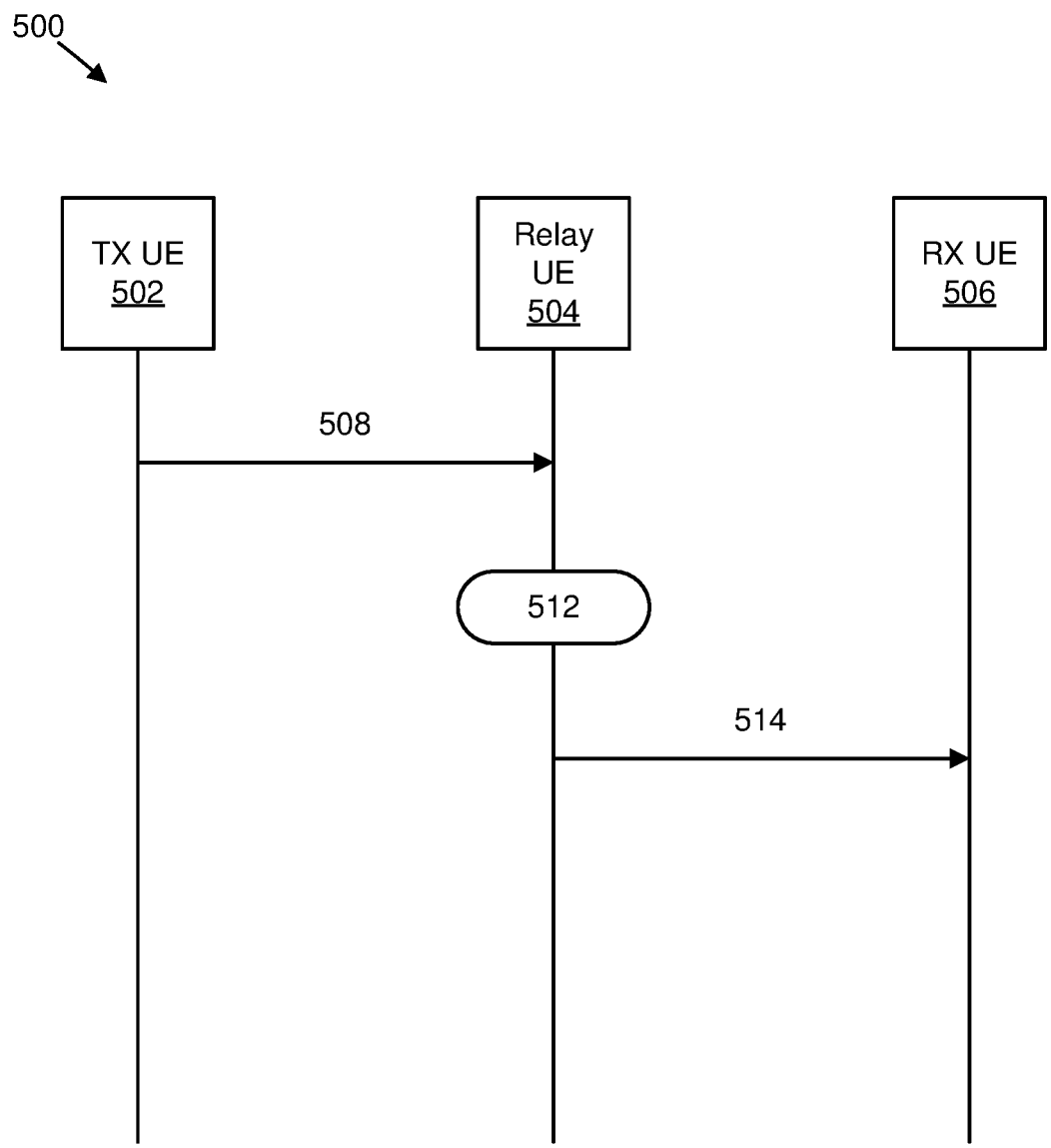
FIG. 5 is a schematic block diagram illustrating another embodiment of communications corresponding to transmitting data using a relay user equipment.

FIG. 5 is a schematic block diagram illustrating another embodiment of communications 500 corresponding to transmitting data using a relay user equipment (e.g., a relay based on a blind hop with no HARQ feedback—within or outside of a group). The communications 500 include messages transmitted between a TX UE 502, a relay UE 504 (e.g., intermediate UE), and a RX UE 506. As may be appreciated, any of the communications described herein may include one or more messages.

In one embodiment, in a first communication 508 transmitted from the TX UE 502 (or another relay UE) to the relay UE 504 (or multiple UEs of which some or all may be relay UEs), the TX UE 502 transmits a transport block (e.g., data) with an indication for relaying the transport block by the relay UE 504 (e.g., any other UE in the group, all other UEs in the group, etc.) without waiting for any HARQ feedback and including a required hop count for the transport block delivery (e.g., in SCI).

In some embodiments, the TX UE 502 may reserve resources for the relay UE 504 to use to transmit (or retransmit) the transport block. Moreover, as part of the first communication 508 (or in another communication) the TX UE 502 may provide the reserved resource information to the relay UE 504. The reserved resource information may include assistance information for reserving resources, such as for periodic resource reservation used for periodic traffic. In certain embodiments, the TX UE 502 may provide the reserved resource information to the relay UE 504 via a first stage or a second stage of SCI, in L1, or in L2.

In certain embodiments, if there is no resource reservation information transmitted from the TX UE 502 (e.g., in SCI) to the relay UE 504, the relay UE 504 may select one or more resources for transmission (or retransmission) from a resource pool (e.g., a dedicated resource pool for such transmissions) based on sensing which resources from the resource pool are available or by randomly selecting resources from within the resource pool. In some embodiments, the resource pool may be based on mode 2d operation.

In certain embodiments, in the first communication 508 transmitted from the TX UE 502 to the relay UE 504 (or multiple UEs of which some or all may be relay UEs), the TX UE 502 (or another relay UE) transmits end to end latency information to the relay UE 504 for the relay UE 504 to use for delivering the transport block. The end to end latency information may be conveyed by transmitting a remaining packet delay budget (e.g., a TTL configuration for transport block reception).

In some embodiments, SCI (e.g., SCI fields) or other signaling may be used to transmit the following information from the TX UE 502 to the relay UE 504: 1) end to end latency information; 2) resource reservation information for the relay UE 504 to use for transmitting or retransmitting data (e.g., a transport block) (for example, this may be included in the first stage or the second stage of the SCI); 3) a direction of the data to be relayed, such as information indicating zone IDs (e.g., IDs corresponding to a zone of UEs), a direction to transmit data, and/or a communication range (e.g., MCR); and/or 4) a remaining hop count, remaining packet delay budget, a destination group ID, a destination node ID, and/or a relay node ID. As may be appreciated, a zone ID may be an identifier that corresponds to a geographic area or zone.

In various embodiments, one or more relay UEs 504 may be selected for transmission (or retransmission) of the transport block received from the TX UE 502. The selection of the one or more relay UEs 504 may be a selection of one or more UEs within a group (e.g., platoon). The selection may be based on one of the following options: 1) a UE within the group; 2) a UE outside of the group; 3) relay node IDs (e.g., transmitted in DCI by the gNB such as part of gNB assisted sidelink scheduling, an L1 relay ID, an L2 relay ID, etc.); 4); a direction, a geolocation, a zone ID, and/or an MCR; 5) a gNB, a group leader UE, or a SUE may configure (e.g., semi-statically, statically, dynamically, etc.) one or more relay UEs 504 that transmit (or retransmit) the transport block; and/or 6) all group member UEs or a subset of group member UEs may be used for transmission, retransmission, and/or relay. In certain embodiments, such as for NR Mode 1 scheduling, the TX UE 402, as part of UE assistance information, may provide information such as direction, geolocation, zone ID, and/or MCR to the gNB.

In various embodiments, an L1 or L2 destination ID field may be set as follows: 1) if a groupcast message (e.g., data, transport block) needs to be relayed inside the same group (e.g., blindly), then the destination group ID should be set to the group ID for which the groupcast message was sent; 2) if a unicast message needs to be relayed inside the group or outside the group, then the destination node ID and the relay node ID should be set so that a relay UE 504 (having the relay node ID) relays the message based on the destination node ID; 3) the relay UE 504 may implicitly understand from a destination group ID and a remaining hop count (value >0) that a message is to be transmitted or retransmitted to a group having the destination group ID—therefore the relay UE 504 transfers the received data from its RX buffer to its TX buffer and transmits or retransmits the message to the group having the destination group ID; and/or 4) the relay UE 504 (having the relay node ID) may implicitly understand from a destination node ID and a relay node ID that a message not for itself is to be transmitted or retransmitted—therefore, the relay UE 504 transfer the received data from the RX buffer to the TX buffer for transmission to the destination node ID.

The relay UE 504 determines 512 whether to retransmit the transport block received from the TX UE 502 (or another relay UE). To make this determination, the relay UE 504 takes into account assistance information received from the TX UE 502 (or another relay UE), such as remaining hop count and a remaining packet delay budget.

In response to the relay UE 504 determining 512 to retransmit the transport block, in a third communication 514, the relay UE 504 retransmits the transport block to the RX UE 506.

In certain embodiments, for a groupcast transmission of a message, the relay UE 504 processes the message, then, with information such as a destination group ID and a remaining hop count, transmits or retransmits the message by transferring the message from its RX buffer to its TX buffer.

In various embodiments, for a unicast transmission of a message, the relay UE 504 receives the message using a relay ID, does not process the message for itself, then, with information such as destination node ID and relay ID, transfers the message to its TX buffer for transmitting or retransmitting the message using the destination node ID.

In some embodiments, the relay UE 504 checks a zone ID, an MCR, and/or a remaining hop count before transmitting or retransmitting a message to make sure that the message should be transmitted or retransmitted and to transmit the message to correct UEs. For example, if the remaining hop count is greater than zero, the message should be transmitted or retransmitted. In certain embodiments, the relay UE 504 adjusts the zone ID, the MCR, and/or the remaining hop count and includes the adjusted zone ID, the adjusted MCR, and/or the adjusted remaining hop count with the message that is transmitted and/or retransmitted.

Figure 6:
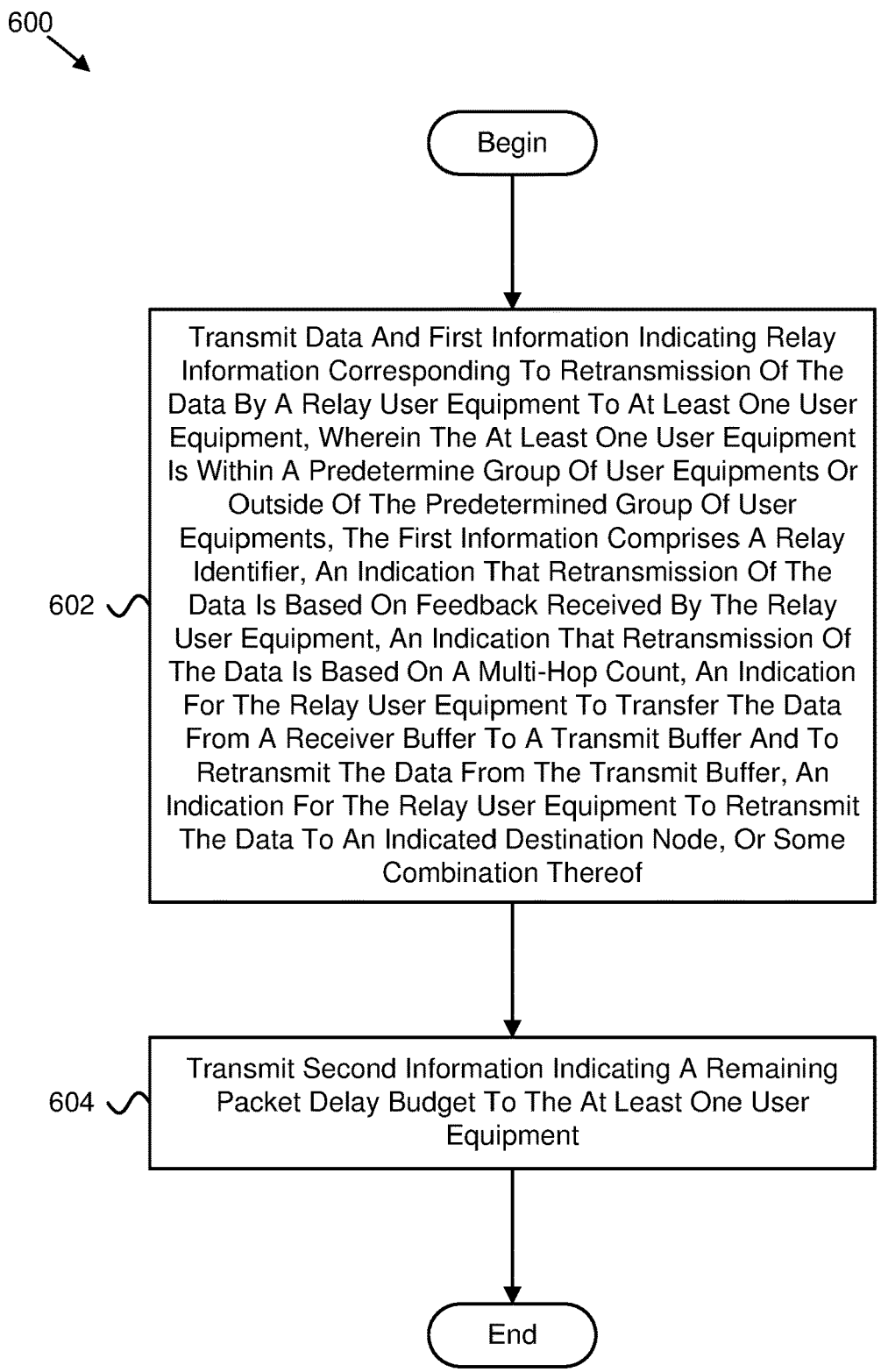
FIG. 6 is a flow chart diagram illustrating one embodiment of a method for transmitting data corresponding to a relay user equipment.

FIG. 6 is a flow chart diagram illustrating one embodiment of a method 600 for transmitting data corresponding to a relay user equipment. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

The method 600 may include transmitting 602 data and first information indicating relay information corresponding to retransmission of the data by a relay user equipment to at least one user equipment. In such an embodiment, the at least one user equipment is within a predetermine group of user equipments or outside of the predetermined group of user equipments, the first information comprises a relay identifier, an indication that retransmission of the data is based on feedback received by the relay user equipment, an indication that retransmission of the data is based on a multi-hop count, an indication for the relay user equipment to transfer the data from a receiver buffer to a transmit buffer and to retransmit the data from the transmit buffer, an indication for the relay user equipment to retransmit the data to an indicated destination node, or some combination thereof. In certain embodiments, the method 600 includes transmitting 604 second information indicating a remaining packet delay budget to the at least one user equipment.

In certain embodiments, the data comprises a transport block. In some embodiments, the second information is part of scheduling assistance information. In various embodiments, the first information and the second information are part of sidelink control information. In certain embodiments, the first information and the second information may be transmitted together for a single stage SCI or separately for two stage SCI.

In one embodiment, the at least one user equipment is selected based on a scheduling user equipment. In certain embodiments, the at least one user equipment is selected based on a negative feedback signal strength, a positive feedback signal strength, a signal indicating retransmission, or some combination thereof. In some embodiments, the at least one user equipment is selected based on a geolocation, a direction, a zone, a configuration, or some combination thereof.

In various embodiments, the method 600 further comprises transmitting third information indicating resource reservation information for the at least one user equipment to retransmit the data, wherein the resource reservation information comprises periodic resource reservation information. In one embodiment, the method 600 further comprises transmitting scheduling assistance information comprising user equipment assistance information indicating a traffic arrival rate for periodic traffic. In certain embodiments, the method 600 further comprises transmitting third information comprising a destination group identifier, wherein the third information is used to determine whether the data is to be processed internally, whether the data is to be retransmitted, or a combination thereof.

In some embodiments, the first information is used to determine whether the data is to be processed internally, whether the data is to be retransmitted, or a combination thereof. In various embodiments, the method 600 further comprises transmitting third information comprising zones corresponding to the data, a minimum communication range, a remaining hop count, or some combination thereof.

Figure 7:
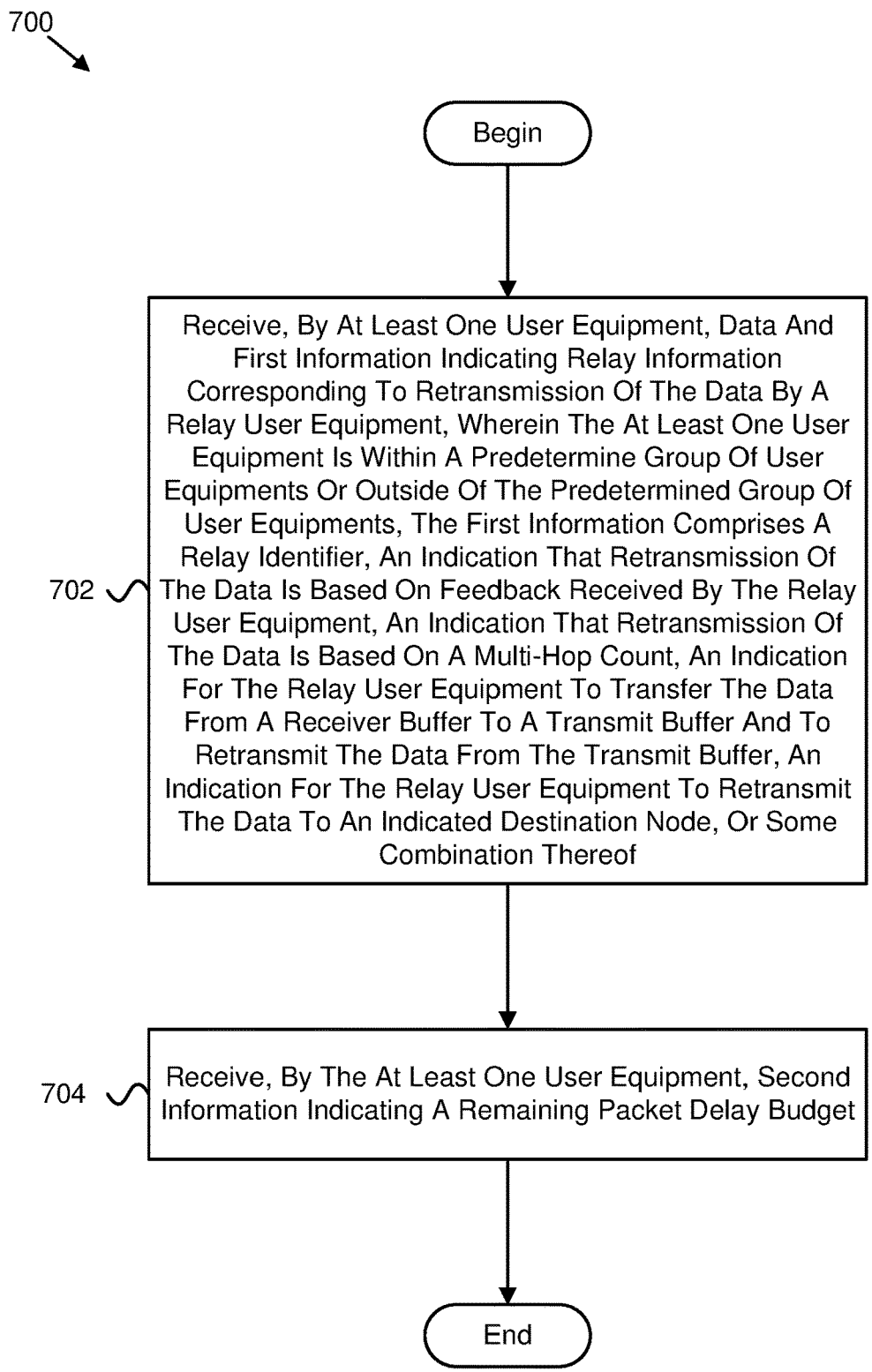
FIG. 7 is a flow chart diagram illustrating one embodiment of a method for receiving data corresponding to a relay user equipment.

FIG. 7 is a flow chart diagram illustrating one embodiment of a method 700 for receiving data corresponding to a relay user equipment. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

The method 700 may include receiving 702, by at least one user equipment, data and first information indicating relay information corresponding to retransmission of the data by a relay user equipment. In such an embodiment, the at least one user equipment is within a predetermine group of user equipments or outside of the predetermined group of user equipments, the first information comprises a relay identifier, an indication that retransmission of the data is based on feedback received by the relay user equipment, an indication that retransmission of the data is based on a multi-hop count, an indication for the relay user equipment to transfer the data from a receiver buffer to a transmit buffer and to retransmit the data from the transmit buffer, an indication for the relay user equipment to retransmit the data to an indicated destination node, or some combination thereof. In certain embodiments, the method 700 includes receiving 704, by the at least one user equipment, second information indicating a remaining packet delay budget.

In certain embodiments, the data comprises a transport block. In some embodiments, the second information is part of scheduling assistance information. In various embodiments, the first information and the second information are part of sidelink control information. In certain embodiments, the first information and the second information may be transmitted together for a single stage SCI or separately for two stage SCI.

In one embodiment, the at least one user equipment is selected based on a scheduling user equipment. In certain embodiments, the at least one user equipment is selected based on a negative feedback signal strength, a positive feedback signal strength, a signal indicating retransmission, or some combination thereof. In some embodiments, the at least one user equipment is selected based on a geolocation, a direction, a zone, a configuration, or some combination thereof.

In various embodiments, the method 700 further comprises receiving third information indicating resource reservation information for the at least one user equipment to retransmit the data, wherein the resource reservation information comprises periodic resource reservation information. In one embodiment, the method 700 further comprises receiving scheduling assistance information comprising user equipment assistance information indicating a traffic arrival rate for periodic traffic. In certain embodiments, the method 700 further comprises receiving third information comprising a destination group identifier, wherein the third information is used to determine whether the data is to be processed internally, whether the data is to be retransmitted, or a combination thereof.

In some embodiments, the first information is used to determine whether the data is to be processed internally, whether the data is to be retransmitted, or a combination thereof. In various embodiments, the method 700 further comprises receiving third information comprising zones corresponding to the data, a minimum communication range, a remaining hop count, or some combination thereof.

In one embodiment, a method comprises: transmitting data and first information indicating relay information corresponding to retransmission of the data by a relay user equipment to at least one user equipment, wherein the at least one user equipment is within a predetermine group of user equipments or outside of the predetermined group of user equipments, the first information comprises a relay identifier, an indication that retransmission of the data is based on feedback received by the relay user equipment, an indication that retransmission of the data is based on a multi-hop count, an indication for the relay user equipment to transfer the data from a receiver buffer to a transmit buffer and to retransmit the data from the transmit buffer, an indication for the relay user equipment to retransmit the data to an indicated destination node, or some combination thereof; and transmitting second information indicating a remaining packet delay budget to the at least one user equipment.

In certain embodiments, the data comprises a transport block.

In some embodiments, the second information is part of scheduling assistance information.

In various embodiments, the first information and the second information are part of sidelink control information. In certain embodiments, the first information and the second information may be transmitted together for a single stage SCI or separately for two stage SCI.

In one embodiment, the at least one user equipment is selected based on a scheduling user equipment.

In certain embodiments, the at least one user equipment is selected based on a negative feedback signal strength, a positive feedback signal strength, a signal indicating retransmission, or some combination thereof.

In some embodiments, the at least one user equipment is selected based on a geolocation, a direction, a zone, a configuration, or some combination thereof.

In various embodiments, the method further comprises transmitting third information indicating resource reservation information for the at least one user equipment to retransmit the data, wherein the resource reservation information comprises periodic resource reservation information.

In one embodiment, the method further comprises transmitting scheduling assistance information comprising user equipment assistance information indicating a traffic arrival rate for periodic traffic.

In certain embodiments, the method further comprises transmitting third information comprising a destination group identifier, wherein the third information is used to determine whether the data is to be processed internally, whether the data is to be retransmitted, or a combination thereof.

In some embodiments, the first information is used to determine whether the data is to be processed internally, whether the data is to be retransmitted, or a combination thereof.

In various embodiments, the method further comprises transmitting third information comprising zones corresponding to the data, a minimum communication range, a remaining hop count, or some combination thereof.

In one embodiment, an apparatus comprises: a transmitter that: transmits data and first information indicating relay information corresponding to retransmission of the data by a relay user equipment to at least one user equipment, wherein the at least one user equipment is within a predetermine group of user equipments or outside of the predetermined group of user equipments, the first information comprises a relay identifier, an indication that retransmission of the data is based on feedback received by the relay user equipment, an indication that retransmission of the data is based on a multi-hop count, an indication for the relay user equipment to transfer the data from a receiver buffer to a transmit buffer and to retransmit the data from the transmit buffer, an indication for the relay user equipment to retransmit the data to an indicated destination node, or some combination thereof; and transmits second information indicating a remaining packet delay budget to the at least one user equipment.

In certain embodiments, the data comprises a transport block.

In some embodiments, the second information is part of scheduling assistance information.

In various embodiments, the first information and the second information are part of sidelink control information. In certain embodiments, the first information and the second information may be transmitted together for a single stage SCI or separately for two stage SCI.

In one embodiment, the at least one user equipment is selected based on a scheduling user equipment.

In certain embodiments, the at least one user equipment is selected based on a negative feedback signal strength, a positive feedback signal strength, a signal indicating retransmission, or some combination thereof.

In some embodiments, the at least one user equipment is selected based on a geolocation, a direction, a zone, a configuration, or some combination thereof.

In various embodiments, the transmitter transmits third information indicating resource reservation information for the at least one user equipment to retransmit the data, and the resource reservation information comprises periodic resource reservation information.

In one embodiment, the transmitter transmits scheduling assistance information comprising user equipment assistance information indicating a traffic arrival rate for periodic traffic.

In certain embodiments, the transmitter transmits third information comprising a destination group identifier, and the third information is used to determine whether the data is to be processed internally, whether the data is to be retransmitted, or a combination thereof.

In some embodiments, the first information is used to determine whether the data is to be processed internally, whether the data is to be retransmitted, or a combination thereof.

In various embodiments, the transmitter transmits third information comprising zones corresponding to the data, a minimum communication range, a remaining hop count, or some combination thereof.

In one embodiment, a method comprises: receiving, by at least one user equipment, data and first information indicating relay information corresponding to retransmission of the data by a relay user equipment, wherein the at least one user equipment is within a predetermine group of user equipments or outside of the predetermined group of user equipments, the first information comprises a relay identifier, an indication that retransmission of the data is based on feedback received by the relay user equipment, an indication that retransmission of the data is based on a multi-hop count, an indication for the relay user equipment to transfer the data from a receiver buffer to a transmit buffer and to retransmit the data from the transmit buffer, an indication for the relay user equipment to retransmit the data to an indicated destination node, or some combination thereof; and receiving, by the at least one user equipment, second information indicating a remaining packet delay budget.

In certain embodiments, the data comprises a transport block.

In some embodiments, the second information is part of scheduling assistance information.

In various embodiments, the first information and the second information are part of sidelink control information. In certain embodiments, the first information and the second information may be transmitted together for a single stage SCI or separately for two stage SCI.

In one embodiment, the at least one user equipment is selected based on a scheduling user equipment.

In certain embodiments, the at least one user equipment is selected based on a negative feedback signal strength, a positive feedback signal strength, a signal indicating retransmission, or some combination thereof.

In some embodiments, the at least one user equipment is selected based on a geolocation, a direction, a zone, a configuration, or some combination thereof.

In various embodiments, the method further comprises receiving third information indicating resource reservation information for the at least one user equipment to retransmit the data, wherein the resource reservation information comprises periodic resource reservation information.

In one embodiment, the method further comprises receiving scheduling assistance information comprising user equipment assistance information indicating a traffic arrival rate for periodic traffic.

In certain embodiments, the method further comprises receiving third information comprising a destination group identifier, wherein the third information is used to determine whether the data is to be processed internally, whether the data is to be retransmitted, or a combination thereof.

In some embodiments, the first information is used to determine whether the data is to be processed internally, whether the data is to be retransmitted, or a combination thereof.

In various embodiments, the method further comprises receiving third information comprising zones corresponding to the data, a minimum communication range, a remaining hop count, or some combination thereof.

In one embodiment, an apparatus comprises: a receiver that: receives, by at least one user equipment, data and first information indicating relay information corresponding to retransmission of the data by a relay user equipment, wherein the at least one user equipment is within a predetermine group of user equipments or outside of the predetermined group of user equipments, the first information comprises a relay identifier, an indication that retransmission of the data is based on feedback received by the relay user equipment, an indication that retransmission of the data is based on a multi-hop count, an indication for the relay user equipment to transfer the data from a receiver buffer to a transmit buffer and to retransmit the data from the transmit buffer, an indication for the relay user equipment to retransmit the data to an indicated destination node, or some combination thereof; and receives, by the at least one user equipment, second information indicating a remaining packet delay budget.

In certain embodiments, the data comprises a transport block.

In some embodiments, the second information is part of scheduling assistance information.

In various embodiments, the first information and the second information are part of sidelink control information. In certain embodiments, the first information and the second information may be transmitted together for a single stage SCI or separately for two stage SCI.

In one embodiment, the at least one user equipment is selected based on a scheduling user equipment.

In certain embodiments, the at least one user equipment is selected based on a negative feedback signal strength, a positive feedback signal strength, a signal indicating retransmission, or some combination thereof.

In some embodiments, the at least one user equipment is selected based on a geolocation, a direction, a zone, a configuration, or some combination thereof.

In various embodiments, the receiver receives third information indicating resource reservation information for the at least one user equipment to retransmit the data, and the resource reservation information comprises periodic resource reservation information.

In one embodiment, the receiver receives scheduling assistance information comprising user equipment assistance information indicating a traffic arrival rate for periodic traffic.

In certain embodiments, the receiver receives third information comprising a destination group identifier, and the third information is used to determine whether the data is to be processed internally, whether the data is to be retransmitted, or a combination thereof.

In some embodiments, the first information is used to determine whether the data is to be processed internally, whether the data is to be retransmitted, or a combination thereof.

In various embodiments, the receiver receives third information comprising zones corresponding to the data, a minimum communication range, a remaining hop count, or some combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:
1. A user equipment (UE), comprising:
   at least one memory; and
   at least one processor coupled with the at least one memory and configured to cause the UE to:
   select a relay UE from a plurality of UEs based at least in part on one or more of a hybrid automatic repeat request (HARQ) feedback received from the relay UE, or a pre-configuration, or a combination thereof;
   reserve a resource for the relay UE for transmission of wireless communication; and transmit, to the relay UE, control information comprising a destination identifier (ID), a relay flag, a HARQ ID, and information indicating the resource for the relay UE for transmission of the wireless communication.

2. The UE of claim 1, wherein the at least one processor is configured to cause the UE to set a relay ID as the destination ID to transmit a message to the relay UE.

3. The UE of claim 1, wherein the at least one processor is configured to cause the UE to transmit the control information using the relay UE.

4. The UE of claim 1, wherein the at least one processor is configured to cause the UE to configure a maximum HARQ retransmission counter for the relay UE.

5. The UE of claim 1, wherein the at least one processor is configured to cause the UE to select the relay UE based at least in part on the HARQ feedback.

6. The UE of claim 5, wherein at least two UEs of the plurality of UEs are selected.

7. A method performed by a first user equipment (UE), the method comprising:
  selecting a relay UE from a plurality of UEs based at least partly on one or more of a hybrid automatic repeat request (HARQ) feedback received from the relay UE, or a pre-configuration, or a combination thereof;
  reserving a resource for the relay UE for transmission of wireless communication; and
  transmitting, to the relay UE, control information comprising a destination identifier (ID), a relay flag, a HARQ ID, and information indicating the resource for the relay UE for transmission of the wireless communication.

8. The method of claim 7, further comprising setting a relay ID as the destination ID to transmit a message to the relay UE.

9. The method of claim 7, further comprising transmitting the control information using the relay UE.

10. The method of claim 7, further comprising configuring a maximum HARQ retransmission counter for the relay UE.

11. A relay user equipment (UE), comprising:
  at least one memory; and
  at least one processor coupled with the at least one memory and configured to cause the relay UE to:
  receive control information from a first UE,
  wherein the relay UE is selected from a plurality of UEs based at least in part on one or more of a hybrid automatic repeat request (HARQ) feedback received from the relay UE, or a pre-configuration, or a combination thereof;
  wherein a resource for the relay UE for transmission of wireless communication is reserved; and
  wherein the control information comprises a destination identifier (ID), a relay flag, a HARQ ID, and information indicating the resource for the relay UE for transmission of the wireless communication.

12. The relay UE of claim 11, wherein the at least one processor is configured to cause the relay UE to check zone IDs, a minimum communication range (MCR), a remaining hop count, or a combination thereof prior to retransmitting the control information.

13. The relay UE of claim 11, wherein the at least one processor is configured to cause the relay UE to adjust a zone ID, a minimum communication range (MCR), or a remaining hop count based on the configuration set by the first UE.

14. The relay UE of claim 11, wherein the at least one processor is configured to cause the relay UE to transmit feedback corresponding to packet delivery to the first UE.

15. The relay UE of claim 11, wherein the at least one processor is configured to cause the relay UE to schedule a retransmission of the control information based at least in part on a remaining packet delay budget value received from the first UE.

16. The relay UE of claim 11, wherein the at least one processor is configured to cause the relay UE to determine to retransmit the control information by transferring received data from a receive (RX) buffer to a transmit (TX) buffer based on the destination ID set as a relay ID, a remaining hop count being greater than zero, the HARQ feedback received as non-acknowledgement (NACK), or a combination thereof.

17. The relay UE of claim 11, wherein the at least one processor is configured to cause the relay UE to retransmit the control information based on HARQ non-acknowledgement (NACK) feedback.

18. The relay UE of claim 11, wherein the at least one processor is configured to cause the relay UE to retransmit the control information based on a HARQ non-acknowledgement (NACK) feedback passing a HARQ NACK feedback reception threshold.

19. The relay UE of claim 11, wherein the at least one processor is configured to cause the relay UE to select one or more relay UEs for retransmission based on the HARQ feedback.

20. A method performed by a relay user equipment (UE), the method comprising:
  receiving control information from a first UE,
  wherein the relay UE is selected from a plurality of UEs based in part on one or more of a hybrid automatic repeat request (HARQ) feedback received from the relay UE, or a pre-configuration, or a combination thereof;
  wherein a resource for the relay UE for transmission of wireless communication is reserved; and
  wherein the control information comprises a destination identifier (ID), a relay flag, a HARQ ID, and information indicating the resource for the relay UE for transmission of the wireless communication.

* * * * *